(No Model.) 2 Sheets—Sheet 1.

E. P. LYNCH.
LISTER PLOW.

No. 347,880. Patented Aug. 24, 1886.

Attest.
Sidney P. Hollingsworth
Wm. R. Kennedy

Inventor.
E. P. Lynch
By his Atty.
Phil. T. Dodge.

(No Model.) 2 Sheets—Sheet 2.

E. P. LYNCH.
LISTER PLOW.

No. 347,880. Patented Aug. 24, 1886.

Attest:
Sidney P. Hollingsworth
Wm. B. Kennedy

Inventor:
E. P. Lynch
By his Atty.
P. T. Dodge

N. PETERS, Photo-Lithographer, Washington, D. C.

United States Patent Office.

EDWARD P. LYNCH, OF DAVENPORT, IOWA.

LISTER-PLOW.

SPECIFICATION forming part of Letters Patent No. 347,880, dated August 24, 1886.

Application filed December 16, 1885. Serial No. 185,823. (No model.)

*To all whom it may concern:*

Be it known that I, EDWARD P. LYNCH, of Davenport, in the county of Scott and State of Iowa, have invented certain Improvements in Lister-Plows, of which the following is a specification.

This invention relates to improvements in what are commonly known as "lister-plows," which consists usually of a walking plow of the double mold-board type provided with mechanism for distributing seed in the furrow, the plow being ordinarily provided with a subsoiling device or its equivalent to loosen the earth in the center of the furrow, that it may be the better adapted to receive the seed.

The aim of the invention is to simplify the construction, secure the automatic and uniform deposition of the seed, and insure the covering of the same by soil which is suitably pulverized.

Figure 1:
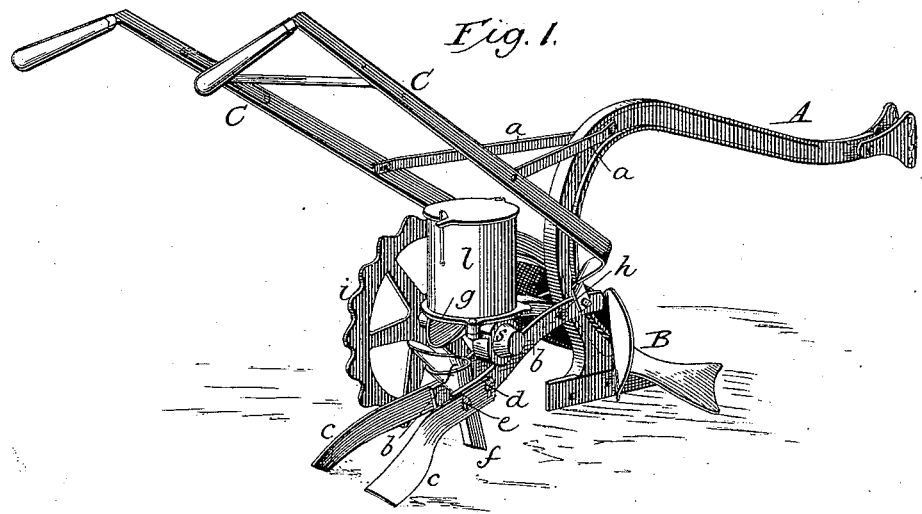
Figure 2:
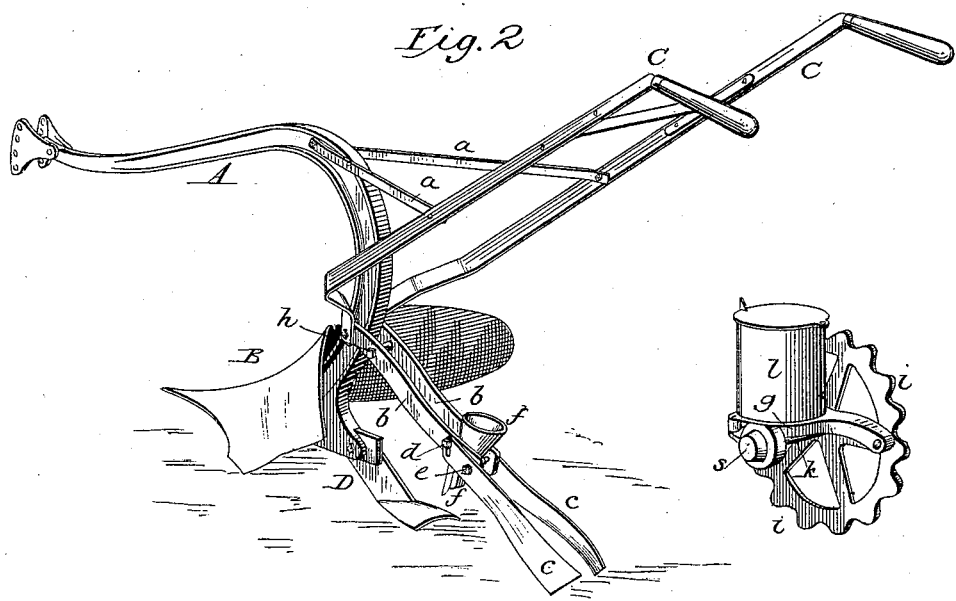
Figure 3:
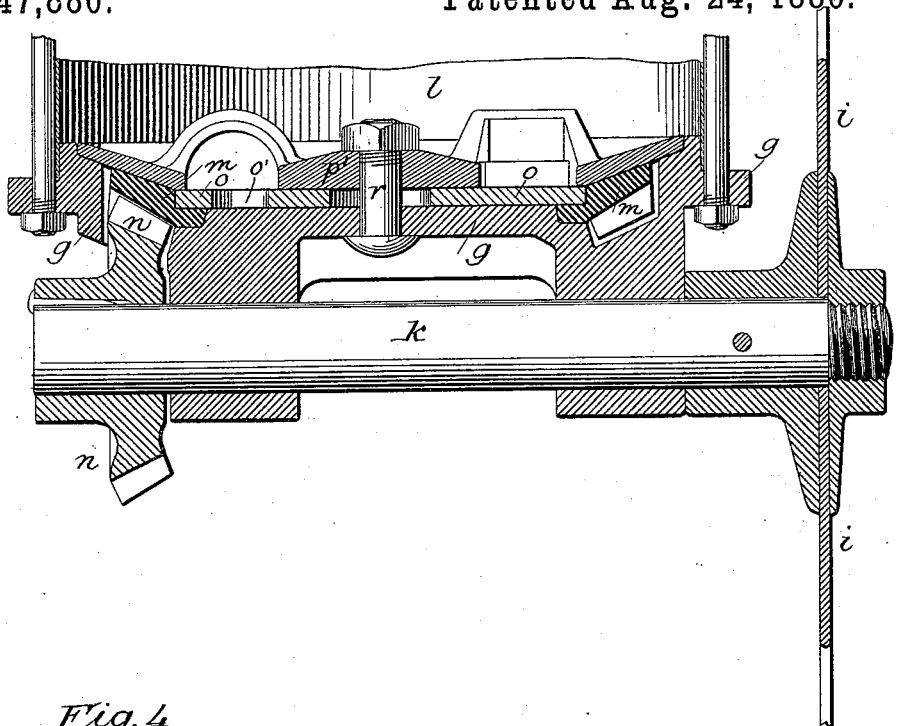
Figure 4:
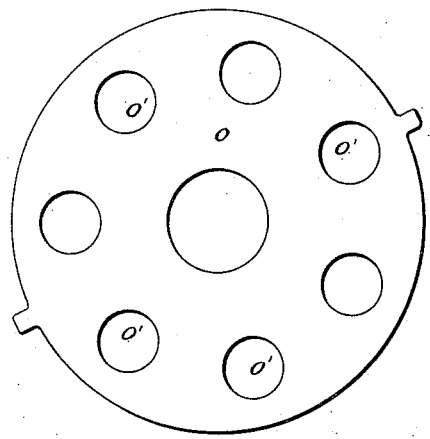
Figure 5:
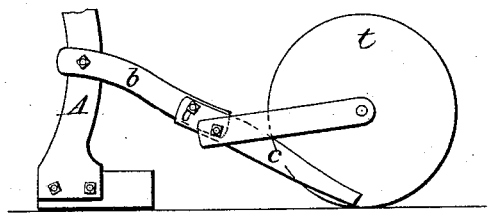

Referring to the accompanying drawings, Figure 1 represents a perspective view of my machine as seen from the rear. Fig. 2 is a similar view of the same as seen from the opposite side, the seed-dropping mechanism being removed and reversed so as to present to view the seed-hopper seen in Fig. 1. Fig. 3 is a transverse vertical section through the center of the seeding mechanism. Fig. 4 is a top plan view of the feeding disk or wheel. Fig. 5 shows a modified form of wheel.

In the drawings, A represents the beam; B, the mold-board; C, the handles, and D the subsoiling device. The beam, which may be of any ordinary construction, is curved downward at its rear end and secured firmly to the double mold-board, which may be of any ordinary form, adapted to turn the earth to the right and the left. The divergent handles are firmly bolted at their forward ends to the beam or other suitable part of the plow and maintained by braces *a* in the ordinary manner. Instead of constructing these handles in the usual form I extend their lower forward ends outward at approximately right angles to the line of progression, and thence backward in approximately parallel lines to the rear end. The sharp outward curvature of the handles at the forward ends immediately above the mold-board is advantageous in that they are caused to serve as fenders or guards to assist in deflecting large clods to the right and left, and particularly to prevent the clods from falling in the path of the feed-operating wheel, hereinafter described.

I am aware that divergent handles of various forms are in common use on plows of this type, but I believe myself to be the first to give the handles such form at the forward end that they will serve to direct the clods outward. The subsoiling-blade D, which may be of the form represented in the drawings, or of any other ordinary form, is bolted centrally to the sole of the plow in position to loosen the soil in the bottom of the main furrow.

In applying my improvements I secure to the beam or the mold-board an arm or arms, *b*, which extend backward and downward rigidly therefrom, and to the rear end of these arms I bolt two covering-blades, *c*, the shape of which is such as to turn the loose soil inward over the seed, which is deposited in advance of them. These covering-blades are secured in place by front and rear bolts, *d* and *e*, the former passing through vertical slots which admit of the blades being adjusted to different positions. Under ordinary conditions the bolts are tightened so as to retain the blades rigidly in position, but by loosening the forward bolts the blades may be allowed a limited movement in a vertical position around the rear bolt as a pivot.

Between the arms *b*, I secure a vertical seed-tube, *f*. For the purpose of delivering the seed I make use of an attachment—such as represented on the plow in Fig. 1 and detached in Fig. 2. This attachment consists of a suitable frame or bed-plate, *g*, united at its forward end by a pivot, *h*, to the rigid arms of the plow, and provided at its rear end with a seed-hopper, seed-feeding devices, and an operating-wheel, *i*, which travels in the furrow. Owing to its pivotal connection with the plow the seeding mechanism is permitted to rise and fall freely and independently, being sustained and driven by the wheel *i*. This wheel traveling in the furrow without being affected in its action by the rise and fall of the plow insures a uniform discharge of the seed. It is in connection with this wheel that the peculiar formation of the handles is of advantage, as before explained.

Referring now to the details of the preceding mechanism, attention is particularly directed to Figs. 3 and 4, in which $k$ represents the horizontal shaft secured to the driving-wheel $i$ and seated in bearings formed in a base plate or frame, $j$, the top of which is suitably flanged or otherwise formed to receive the lower end of the hopper-body $l$, which will be secured thereto by bolts or in any other suitable manner. The base-frame is recessed to receive an annular gear, $m$, which receives motion from a pinion, $n$, secured to the shaft $k$. The gear $m$ has its central opening adapted to receive a circular feed-plate, $o$, provided, as shown in Fig. 4, with a series of seed cells or cavities, $o'$, arranged in circular line about its center after the manner of the feed-plates commonly used at the present day in corn-planting machines. The feed-plate is confined in position by an overlying cut-off plate, $p'$, seated at its edges on the base-plate, and secured at the center by a bolt, $r$, passing therethrough and through the base-plate. The cut-off plate is provided at a suitable point with an opening to admit seed thereto into the cells of the feed-plate in the ordinary manner, and the base-plate is provided at its rear side with a throat or outlet, as shown in Fig. 2, through which the seed is discharged into the spout $f$, and thence into the furrow.

It is to be understood that the details of the seed-dropping mechanism may be varied, and that in place of the rotary disk any other equivalent form of dropping mechanism at present known in the art may be substituted, the only requirement being that the dropping mechanism shall receive motion from the supporting-wheel $i$. The pinion $n$ may be covered, as shown in the drawings, by a cap, $s$, which will prevent the earth from finding its way into the operative parts.

While I prefer to make use of the details herein shown, it is to be understood that the essential feature of my invention consists in a seeding mechanism arranged to rise and fall independently of the plow proper, and in having the seed mechanism supported and driven by the wheel running in the furrow.

I prefer to construct the wheel, as represented in the drawings, of a thin or plate-like form and with a serrated edge, so that it will sink through clods or other obstructions, and thus avoid the excessive vertical play which would result from the use of a broad-faced wheel or roller. It will be noticed that the location of this feed-opening at the rear of the device and above the feed-spout exposes the seed constantly to the view of the operator, who is thus enabled to determine whether the parts are working in the proper manner, and also whether the supply of seed is exhausted.

In soils such as are most commonly encountered it will be unnecessary to provide any support for the covering-blades or feed-spout; but, in order that the machine may meet all conditions encountered, I propose to provide, as shown in Fig. 5, an adjustable carrying wheel or roller, $t$, attached to an arm or arms extending backward between the covering-blades. This arm may be secured at its forward end by the same bolts which secure the covering-blades, or by equivalent bolts, and it may be rendered adjustable in like manner by means of a slot for the passage of one of the bolts. This cover will not only limit the depth to which the blades will enter the ground, but will serve to press down the soil upon the seed.

Having thus described my invention, what I claim is—

1. In a lister-plow, the combination of a double mold-board, and seeding devices in rear thereof, with handles C, having their forward ends extended abruptly outward above the mold-board to serve as guards or fenders.

2. In a lister-plow, the combination of the mold-board plow, the seed-dropping mechanism pivoted freely at its forward end to the plow that it may rise and fall, and a supporting and operating wheel for said seeding mechanism connected thereto at one side, whereby it is adapted to travel at the side of the furrow, as and for the purpose described.

3. In a lister-plow, the combination of the mold-board, covering devices in rear thereof, a seed-dropping mechanism, and an operating-wheel for said mechanism constructed of a thin or plate-like form, whereby it is adapted to cut its way through the loose soil and clods, and thereby cause a uniform distribution of the seed.

4. In a lister-plow, the combination of the mold-board, the centrally-located seed-dropping mechanism in rear thereof, covering devices in rear of the wheel, and the operating-wheel located at one side of the seeding and covering devices in position to avoid passing over the seed.

5. In a lister-plow, the combination of the double mold-board plow, the arms $b$, secured thereto, the seeder frame or plate pivoted between said arms, the distributing mechanism thereon, the transverse axle geared to the distributing mechanism, and the supporting and driving wheel $i$, fixed to one end of said axle.

In testimony whereof I hereunto set my hand, this 2d day of November, 1885, in the presence of two attesting witnesses.

EDWARD P. LYNCH.

Witnesses:
G. WATSON FRENCH,
GEORGE J. BARKER.